(12) United States Patent
Dietrich et al.

(10) Patent No.: US 7,085,542 B2
(45) Date of Patent: *Aug. 1, 2006

(54) PORTABLE DEVICE INCLUDING A REPLACEABLE COVER

(75) Inventors: Aaron Dietrich, Caledonia, IL (US); Michael Charlier, Palatine, IL (US); Thomas Gitzinger, Palatine, IL (US); Matthew C. Loppnow, Pleasant Prairie, WI (US)

(73) Assignee: Motorola, Inc., Schaumburg, IL (US)

( * ) Notice: Subject to any disclaimer, the term of this patent is extended or adjusted under 35 U.S.C. 154(b) by 350 days.

This patent is subject to a terminal disclaimer.

(21) Appl. No.: 10/158,439

(22) Filed: May 30, 2002

(65) Prior Publication Data
US 2004/0203502 A1    Oct. 14, 2004

(51) Int. Cl.
*H04B 1/38* (2006.01)
*H04M 1/00* (2006.01)
*H04M 9/00* (2006.01)

(52) U.S. Cl. ............... 455/90.3; 455/550.1; 455/575.1; 379/433.11

(58) Field of Classification Search ............... 455/90.3, 455/550.1, 575.1–575.9, 90.1; 345/168, 345/173, 174, 179; 379/433.11, 434, 428, 379/433.01, 433.06; 361/270, 271; 382/122–124; 178/18.06, 19.03; 341/15
See application file for complete search history.

(56) References Cited

U.S. PATENT DOCUMENTS

| | | | |
|---|---|---|---|
| 5,565,658 A * | 10/1996 | Gerpheide et al. ....... | 178/18.02 |
| 5,861,875 A | 1/1999 | Gerpheide | |
| 5,911,121 A * | 6/1999 | Andrews .................... | 455/418 |
| 6,049,790 A * | 4/2000 | Rhelimi ...................... | 705/73 |
| 6,222,528 B1 | 4/2001 | Gerpheide et al. | |
| 6,269,449 B1 * | 7/2001 | Kocis ......................... | 713/310 |
| 6,278,888 B1 * | 8/2001 | Hayes et al. ................ | 455/566 |
| 6,487,397 B1 * | 11/2002 | Fuhrmann et al. ......... | 455/90.1 |
| 6,538,456 B1 * | 3/2003 | Dickinson et al. .......... | 324/658 |
| 6,674,358 B1 * | 1/2004 | Tinsley ...................... | 340/7.63 |
| 6,898,283 B1 * | 5/2005 | Wycherley et al. .... | 379/433.11 |
| 2002/0049070 A1 | 4/2002 | Bick | |
| 2002/0068537 A1 * | 6/2002 | Shim et al. .............. | 455/177.1 |
| 2003/0016849 A1 * | 1/2003 | Andrade .................... | 382/124 |
| 2004/0249485 A1 * | 12/2004 | Bondarev et al. ............. | 700/71 |

FOREIGN PATENT DOCUMENTS

| | | |
|---|---|---|
| EP | 1 091 540 A2 * | 4/2001 |
| EP | 1 197 835 * | 4/2002 |
| GB | 2 362 071 * | 11/2001 |

* cited by examiner

*Primary Examiner*—Charles N. Appiah
(74) *Attorney, Agent, or Firm*—Matthew C. Loppnow (57) ABSTRACT

An apparatus and method utilizing a portable device including an array sensor and a replaceable housing. The apparatus can include a main housing, a first replaceable housing configured to be coupled to the main housing, an array sensor coupled to the main housing, a sensing module coupled to the array sensor, the sensing module being configured to sense a change in a field across the array sensor using a predefined conductive pattern, and an adjustment module coupled to the array sensor, the adjustment module being configured to adjust a parameter of operation of the mobile communication device in response to the sensing module sensing the change in the field using the predefined conductive pattern.

25 Claims, 7 Drawing Sheets

PORTABLE DEVICE INCLUDING A REPLACEABLE COVER

BACKGROUND OF THE INVENTION

1. Field of Invention

The present invention is directed to a method and apparatus utilizing a portable device including a replaceable cover. In particular, the present invention relates to a handheld portable device including a replaceable housing and an array sensor.

2. Description of Related Art

Presently, mobile communication devices and hand held portable devices such as mobile phones, pagers, portable games, remote controls, and the like, provide communication and other functionality for users on the go. For example, a user with a mobile phone or a user with a portable game can use these devices while in a car. Also, enhanced applications on portable devices are increasing in popularity. For example, mobile phones may include personal organizer applications, Internet access applications, messaging applications, gaming applications, phone book applications, or the like. Unfortunately, the enhanced applications may require inputs exceeding the available inputs on the device. For example, typical numeric keypads are not easily useful for gaming purposes. Also, the limited surface area of a mobile communication device limits the number of inputs that can be added to the mobile communication device. For example, a full personal computer keyboard cannot be added to a mobile communication device without limiting its portability. Thus, mobile communication devices do not provide adequate inputs for enhanced applications.

Furthermore, portable device input functionality is becoming increasingly complex. For example, additional applications may require additional keys, dials, buttons, or the like for efficient operation. In particular, scrolling buttons may be located on the face of a portable device to allow a user to scroll through options on a display. Other examples include volume control buttons, option selection buttons, voice memo keys, or the like. Unfortunately, these additional keys can clutter the face of a portable device making the portable device difficult to use. Furthermore, the limited space on the face of the portable device limits the number of additional input devices that can be added to the portable device. Additionally, the additional input devices can reduce the ability of an inexperienced user to understand the operation of the portable device. Accordingly, these mobile communication devices also do not provide adequate user input features.

Capacitive-based touch pads are disclosed in U.S. Pat. No. 5,565,658, issued on Oct. 15, 1996 to Gerpheide et al., U.S. Pat. No. 5,861,875, issued on Jan. 19, 1999 to Gerpheide, and U.S. Pat. No. 6,222,528 B1, issued on Apr. 24, 2001 to Gerpheide et al. These touch pads are disclosed as being a replacement for a mouse on both laptop and desktop computers. In particular, these touch pads are disclosed as being particularly useful as replacement pointing devices on computers utilizing full keyboards and displays such as monitors or large LCD displays. Unfortunately, such computers are not useful as mobile communication devices because of their limited portability. In particular, full keyboards, monitors, and even laptop computers are cumbersome to conveniently carry on a person. Another problem exists in that the touch pads take up a relatively large amount of surface area in addition to the keyboards and displays. Thus, the touch pad may add to the inconvenience of carrying a device that the touch pad is attached to when the touch pad is included along with a full keyboard and display.

Therefore, there is a need for a means for convenient data entry for enhanced applications on a portable device.

SUMMARY OF THE INVENTION

The invention provides an apparatus and method utilizing a portable device including an array sensor and a replaceable housing. The apparatus can include a main housing, a first replaceable housing configured to be coupled to the main housing, a capacitive or impedance array sensor coupled to the main housing, a sensing module coupled to the capacitive array sensor, the sensing module being configured to sense a change in a capacitive field across the capacitive array sensor using a predefined conductive pattern, and an adjustment module coupled to the capacitive array sensor, the adjustment module being configured to adjust a parameter of operation of the mobile communication device in response to the sensing module sensing the change in the capacitive field using a predefined conductive pattern.

The adjustment module can be further configured to modify a capacitive sensing parameter to correlate to a function of the first replaceable housing. The sensing module can be further configured to sense a replacement of a second replaceable housing with the first replaceable housing by sensing a change in a capacitive field across the capacitive array sensor based on the predefined conductive pattern. The adjustment module can be further configured to modify a capacitive sensing parameter by remapping the capacitive array from a function of the second replaceable housing to a function of the first replaceable housing.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 1:
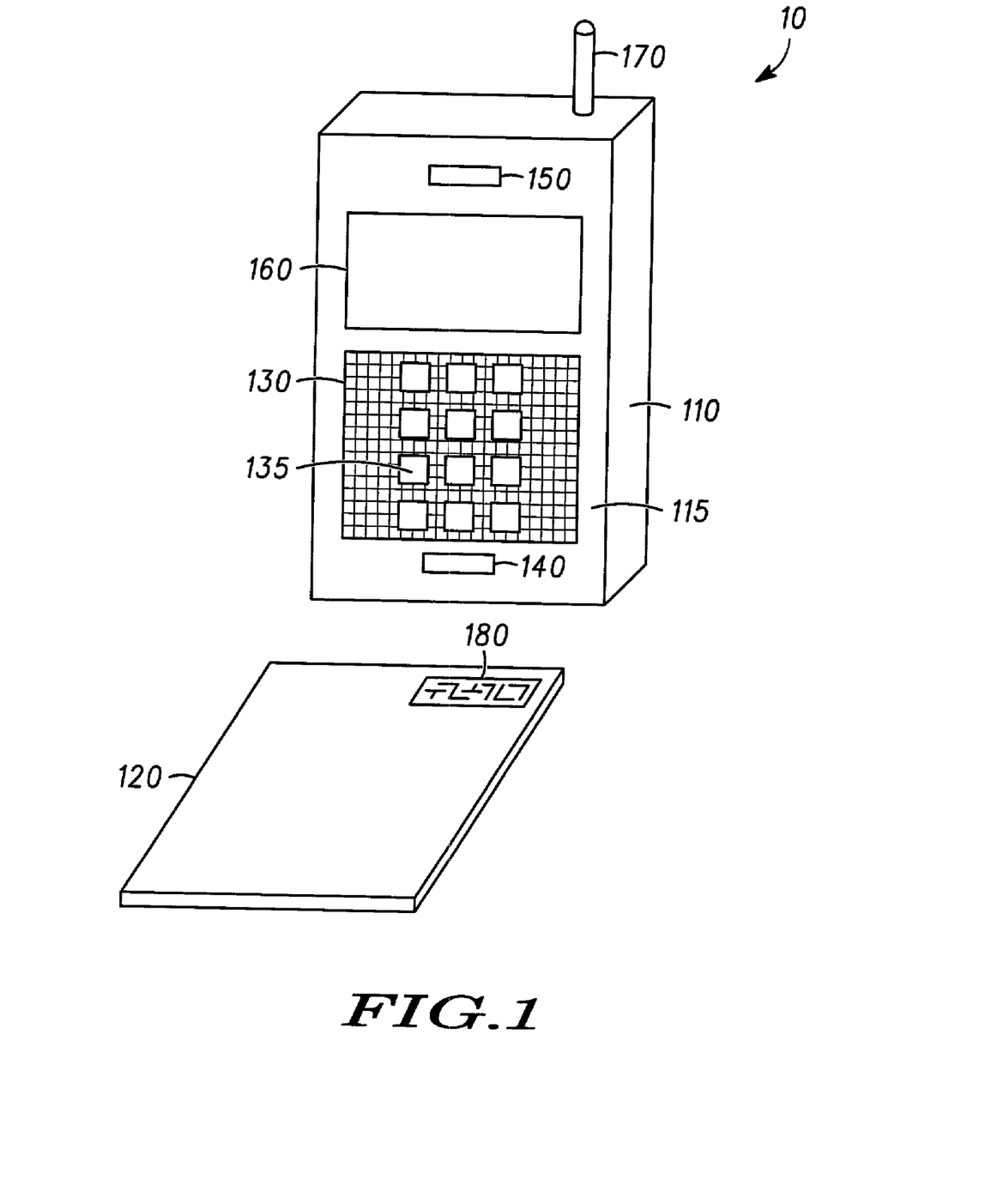
FIG. 1 is an exemplary illustration of a portable device according to a first embodiment.

FIG. 1 is an exemplary illustration of a portable device 10 according to one embodiment of the invention. The portable device 10 may be any form of portable personal device, such as a personal digital assistant, a mobile phone, a pager, a portable game, or the like. Preferably, the portable device 10 is a mobile communication device. The portable device 10 can include a main housing 110 including a face 115, a replaceable housing 120, a touch pad or array sensor 130, a keypad 135, an audio input device 140, an audio output device 150, a visual output device 160, an antenna 170, and a pattern 180. The main housing 110 or the replaceable housing 120 may include any combination of the keypad 135, the audio input device 140, the audio output device 150, the visual output device 160, or other components. The keypad 135 may be a numeric keypad and the array sensor 130 may be located beneath the keypad 135. The replaceable housing 120 may be made of a flexible material such as rubber or leather, a solid material such as plastic, or any other material. Furthermore, the replaceable housing 120 may have openings through which the keypad 135 may be accessed. The portable device 10 does not necessarily require multiple input and output devices. For example, the mobile communication device may utilize only the array sensor 130 for input and the display 160 for output.

The replaceable housing 120 may be coupled to the main housing 110 by means of a rotatable coupling, a slidable coupling, a detachable coupling, or any other means for coupling a first housing to a second housing. For example, the replaceable housing 120 may rotate about or slide along the face of the first housing 115 or may pivot along an edge of the main housing 110. The audio input device 140 may be a microphone. The audio output device 150 may be a speaker. The display 160 may be a LCD display, a LED display, or any other display useful for displaying visual information. The display 160 can incorporate a backlight for ease of viewing displayed information. The array sensor 130 may be located underneath the keypad 135 located on the face of the first housing 115. The array sensor 130 may be an impedance sensor, a capacitive array sensor, an inductive array sensor, or any other sensor useful for sensing an object in close proximity to the array sensor 130. For example, the array sensor 130 may include x-axis and y-axis electrodes that are printed on a plastic substrate. These electrodes can be charged up and monitored for changes as described below.

The pattern 180 may be a predefined conductive pattern. This pattern 180 may be a unique metal structure placed in the flip that can produce a unique x-y pattern that can be sensed by the array 130. For example, the pattern 180 may be a predefined conductive pattern utilizing a conductive element, the antenna 170, a second antenna, metal deposited in the replaceable housing 120, or any other conductive device or substance. The pattern 180 may be predefined. For example, the pattern may take the form of bar codes, numbers, letters, symbols, hidden patterns, specially designed patterns, or any other pattern that can be used as an identifier or the like.

In operation, the portable device 10 can communicate with other mobile communication devices, base stations, or the like. The audio input device 140 can receive audio signals for transmission and the audio output device 150 can output received communication signals in audio format. The display 160 can display visual information to a user of the portable device 10, such as a dialed phone number, a signal strength indicator, phone book entries, text messages, icons, or any other useful visual information.

The array sensor 130 can be tuned to detect the pattern 180. For example, the array sensor can detect a predefined pattern specific to a particular replaceable housing 120. The mobile device 10 can then change a mode of operation, activate a dormant function, or download a new function specific to the replaceable housing 120. The pattern 180 can also be used for authentication purposes.

The array sensor 130 can also be tuned to detect the position of a conductive body, such as a finger, based on, for example, changes in the capacitances in electrodes. The sensitivity or range at which a body changes the capacitance of the electrode enough to be detected can be tunable from tenths of a millimeter to as much as over 12 millimeters. For example, the array sensor 130 can scan for a finger to come into a different distance that changes the capacitance of the array sensor 130 for activation. Thus, the invention can provide additional input functionality for a portable device 10.

Figure 2:
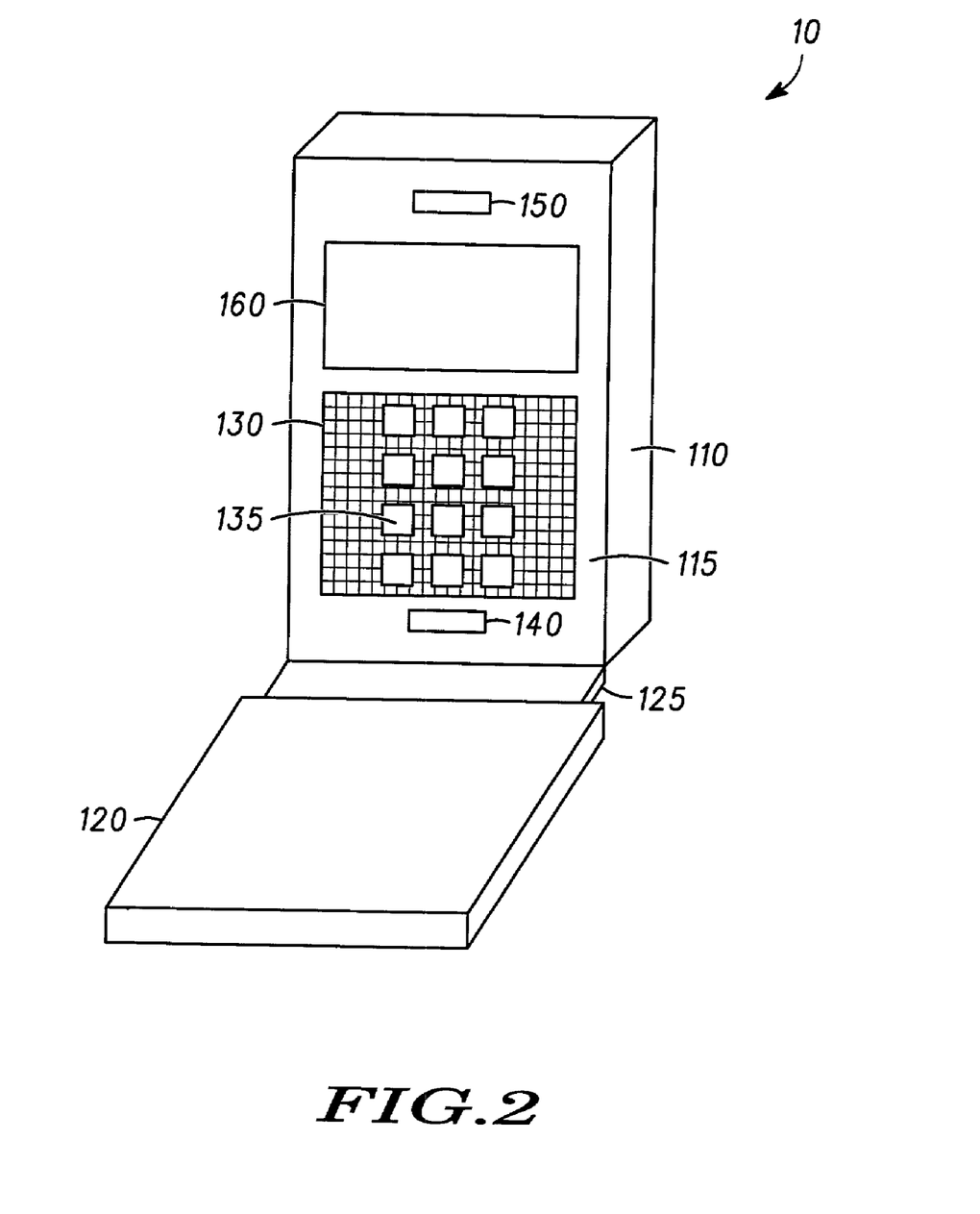
FIG. 2 is an exemplary illustration of the portable device according to a second embodiment.

FIG. 2 is an exemplary illustration of the portable device 10 according to a second embodiment. The portable device 10 may include a face cover 125 which may open to provide access to at least a portion of or the entire face of the first housing 115 or close to cover the face of the first housing 115. This diagram illustrates one example of the portable device 10 with the replaceable housing 120 covering the face cover 125 in an open position. The face cover 125 may be rotatably coupled to the main housing 110. In operation, when the face cover and replaceable housing 120 are in a closed position, the array sensor 130 can adjust or increase its sensitivity from an open position sensitivity 210 corresponding to the face of the first housing 115 to a closed position sensitivity 220 corresponding to an exterior of the face cover 125 and second housing 240. Thus, the invention can provide for additional input functionality, even when the keypad 135 is covered with the face cover 125 and replaceable housing 120 in a closed position. For example, the replaceable housing 120 may include markings for input functions as described below.

Figure 3:
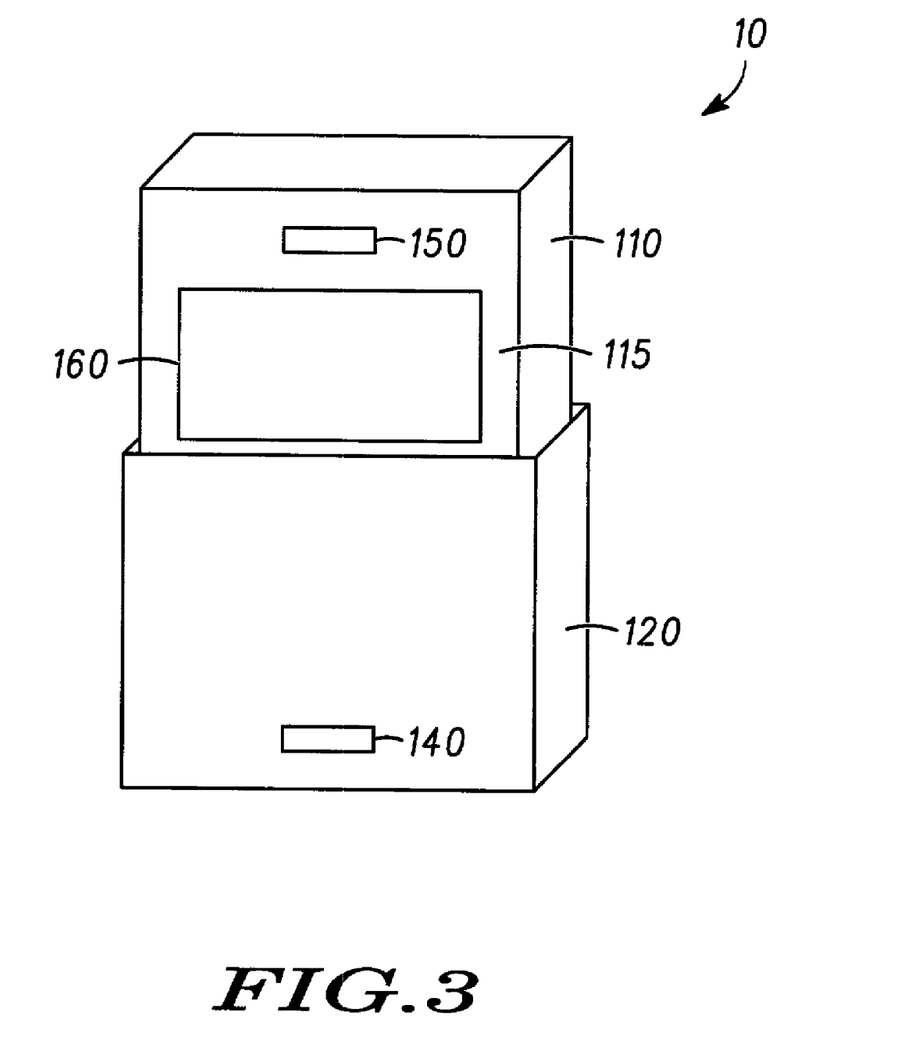
FIG. 3 is an exemplary illustration of the portable device according to a third embodiment.

FIG. 3 is an exemplary illustration of the portable device 10 according to a third embodiment. This diagram illustrates one example of the portable device 10 with the replaceable housing 120 covering a portion of the portable device 10. The replaceable housing 120 may cover any portion of the portable device 10, including the entire portable device 10. Also, the replaceable housing 120 may be a holster such as a carrying case, a belt clip, or the like. In operation, the array sensor 130 can sense conductive objects on the exterior of the replaceable housing 120. A conductive object can include a finger, a stylus, or any other object detectable by the array sensor 130.

Figure 4:
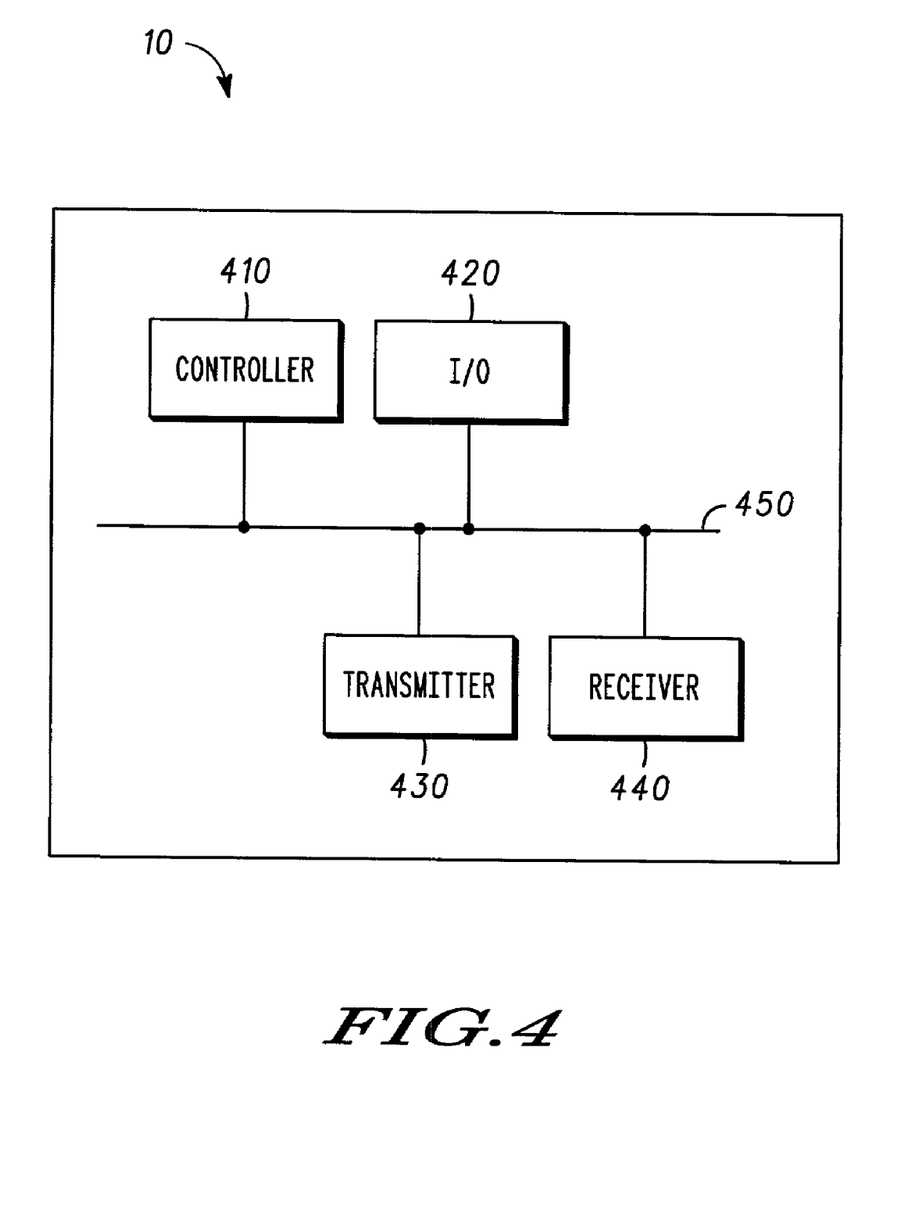
FIG. 4 is an exemplary block diagram of the portable device according to another embodiment.

FIG. 4 is an exemplary block diagram of the portable device 10 according to another embodiment. The portable device 10 can include a controller 410, input/output (I/O) circuitry 420, transmitter circuitry 430, receiver circuitry 440, and a bus 450. In operation, the bus 450 allows the various circuitry and components of the portable device 10 to communicate with each other. The I/O circuitry provides an interface for the I/O devices such as the array sensor 130, the keypad 135, the audio input device 140, the display 160, and the audio output device 150. The transmitter circuitry 430 provides for the transmission of communication signals to other mobile communication devices, base stations, or the like. The receiver circuitry 440 provides for the reception of communication signals from other mobile communication devices, base stations, or the like. The controller 410 controls the operation of the portable device 10.

According to one embodiment, the controller 410 senses a change in a capacitive field across the array sensor 130 based on a position of the first replaceable housing 120 using a conductive pattern 180 and adjusts a parameter of operation of the portable device 10 based on the position of the first replaceable housing 120. For example, the controller 410 can detect when the replaceable housing is placed on the portable device 10. The controller 410 may also modify a capacitive sensing parameter to correlate to a function of the first replaceable housing 120. For example, the function may be a gaming function, a speed dial function, or any other function useful on a replaceable housing. The controller 410 may additionally sense a replacement of a second replaceable housing with the first replaceable housing 120 by sensing a change in a capacitive field across the array sensor 130 based on the conductive pattern 180. Different first and second replaceable housings may include those illustrated in FIGS. 7–10 as described below and may include any other replaceable housing. Furthermore, the controller 410 may modify a capacitive sensing parameter by remapping the array sensor 130 from a function of the second replaceable housing to a function of the first replaceable housing 120. The first replaceable housing 120 may be a housing including gaming controller indicators, quick dial indicators, or any other useful buttons, knobs, dials, or other indicators.

The controller 410 may also download an application related to the first replaceable housing 120 based on the conductive pattern 180. For example, upon detection of the pattern 180, the controller 410 may access a server via a wireless service. After authentication, the controller 410 may then download an application and install it on the device 10 for use with the replaceable housing 120. As a further example, if a replaceable housing 120 with keys and buttons for gaming is installed on the device 10, the controller 410 may then download games for use with the replaceable housing 120.

Additionally, the controller 410 may activate a function related to the replaceable housing 120 based on the conductive pattern 180. For example, the device 10 may include inactive or dormant functions related to a specific replaceable housing 120. Upon installation of the replaceable housing 120, the controller 410 may activate the function specific to the replaceable housing 120. As a further example, the device 10 may include a dormant quick dial function. Upon installation of a replaceable housing 120 including quick dial buttons or indicators, the controller 410 may then activate the quick dial function.

The controller 410 may also operate in the device 10 by sensing a replacement of the second replaceable housing with the first replaceable housing 120 and adjusting a parameter of operation of the array sensor 130 based on a position of the first replaceable housing 120. The controller 410 may also operate by modifying a sensing parameter, such as an impedance, a capacitive, or an inductive sensing parameter, to correlate to a function of the first replaceable housing 120. For example, the controller 410 may adjust the sensitivity of the array sensor 130. As another example, the controller 410 may modify a detection algorithm within the controller 410 to detect specific activities sensed by the array sensor 130. In this example, the controller 410 may detect certain movements of conductive objects in specific locations on the face of the device 10. These objects may include a finger, a button, an indicator, or the like.

The controller 410 may also operate by modifying the sensing parameter by remapping an array matrix according to a functionality of the first replaceable housing 120. For example, the controller 410 may include a matrix associated with locations of buttons or indicators on the replaceable housing 120. The controller 410 can then detect the depression of a button at a specific location according to the matrix. Then controller 410 can then activate a function associated with the button. The controller 410 may also operate by sensing the replacement of the second replaceable housing with the first replaceable housing 120 by sensing a change in a capacitive field across the array sensor 130 based on the conductive pattern 180.

Figure 5:
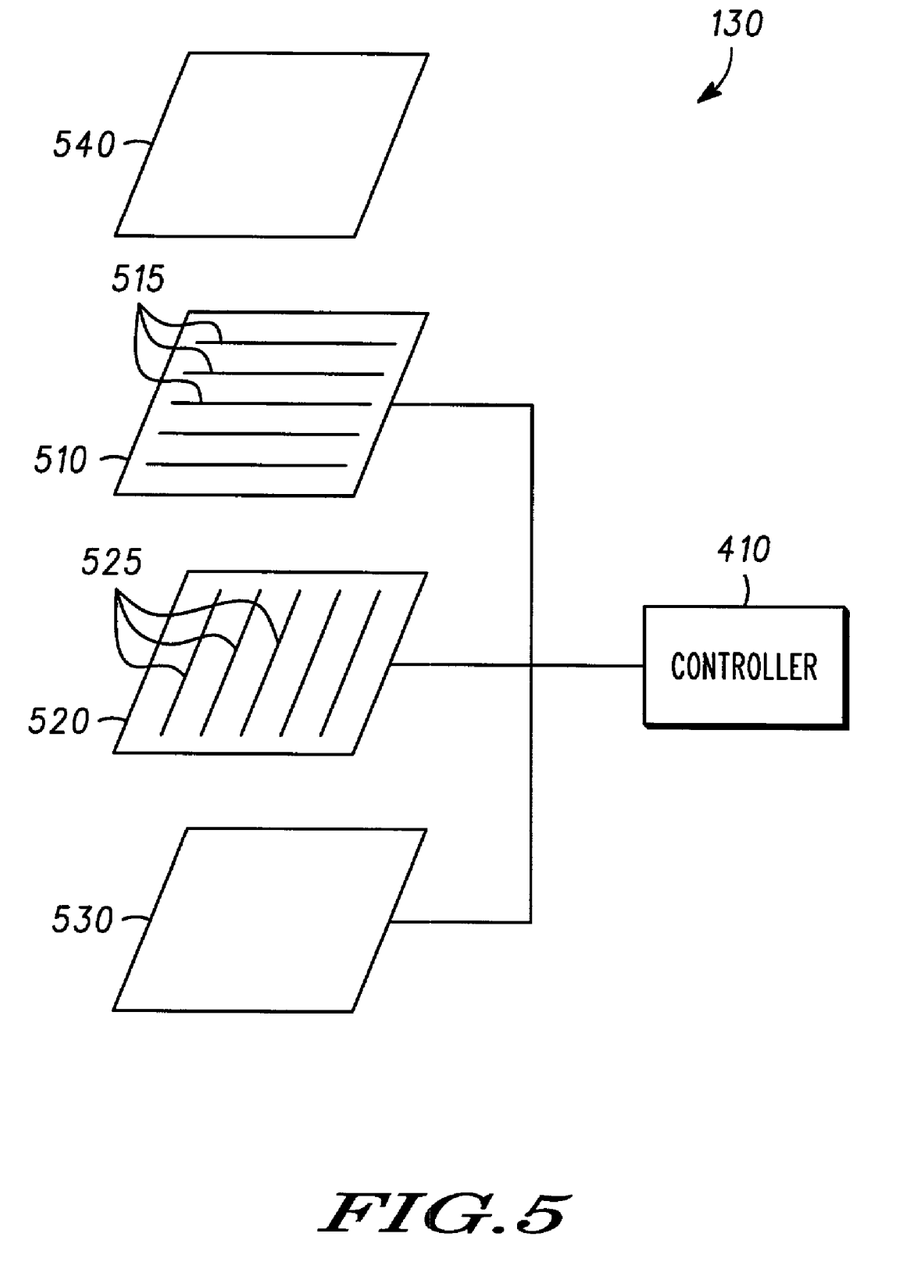
FIG. 5 is an exemplary illustration of a capacitive array sensor according to one embodiment.

FIG. 5 is an exemplary illustration of an example of the array sensor 130 as a capacitive array sensor 130 according to one embodiment. The array sensor 130 can include a first electrode array 510 including electrodes 515, a second electrode array 520 including electrodes 525, a touch pad surface 540, and a sense electrode 530. The first electrode array 510 can cross over the second electrode array 520 with the first array electrodes 515 perpendicular to the second array electrodes 525 to define a crossover region. A spacer such as a dielectric, an insulator, an air gap, or the like may separate the electrode arrays 510 and 520.

In operation, the first electrode array 510 can establish an electric field in conjunction with the second electrode array 520. This electric field can also be determined with respect to the sense electrode 530. The sense electrode 530 is not necessary for operation of the electrode arrays 510 and 520. In particular, an electric field or capacitances may be generated between the electrode arrays 510 and 520 without using a sense electrode 530. The controller 410 may supply electrical charges to the first electrode array 510 and the second electrode array 520 to develop the electric field such that a capacitance is present between the electrode arrays 510 and 520 or between each electrode array 510 and 520 and the sense electrode 530. The controller 410 may detect the presence of a conductive object in close proximity to the touch pad surface 540 based on effects of the conductive object on the capacitance. For example, a conductive object, such as a finger, in close proximity to the array sensor 130 can decrease the capacitance. The controller 410 can then detect the presence of the conductive object by measuring the decrease in capacitance. The controller 410 can then determine the position of the conductive object based on the changes in the capacitance relating to the relevant electrodes 515 and 525.

Figure 6:
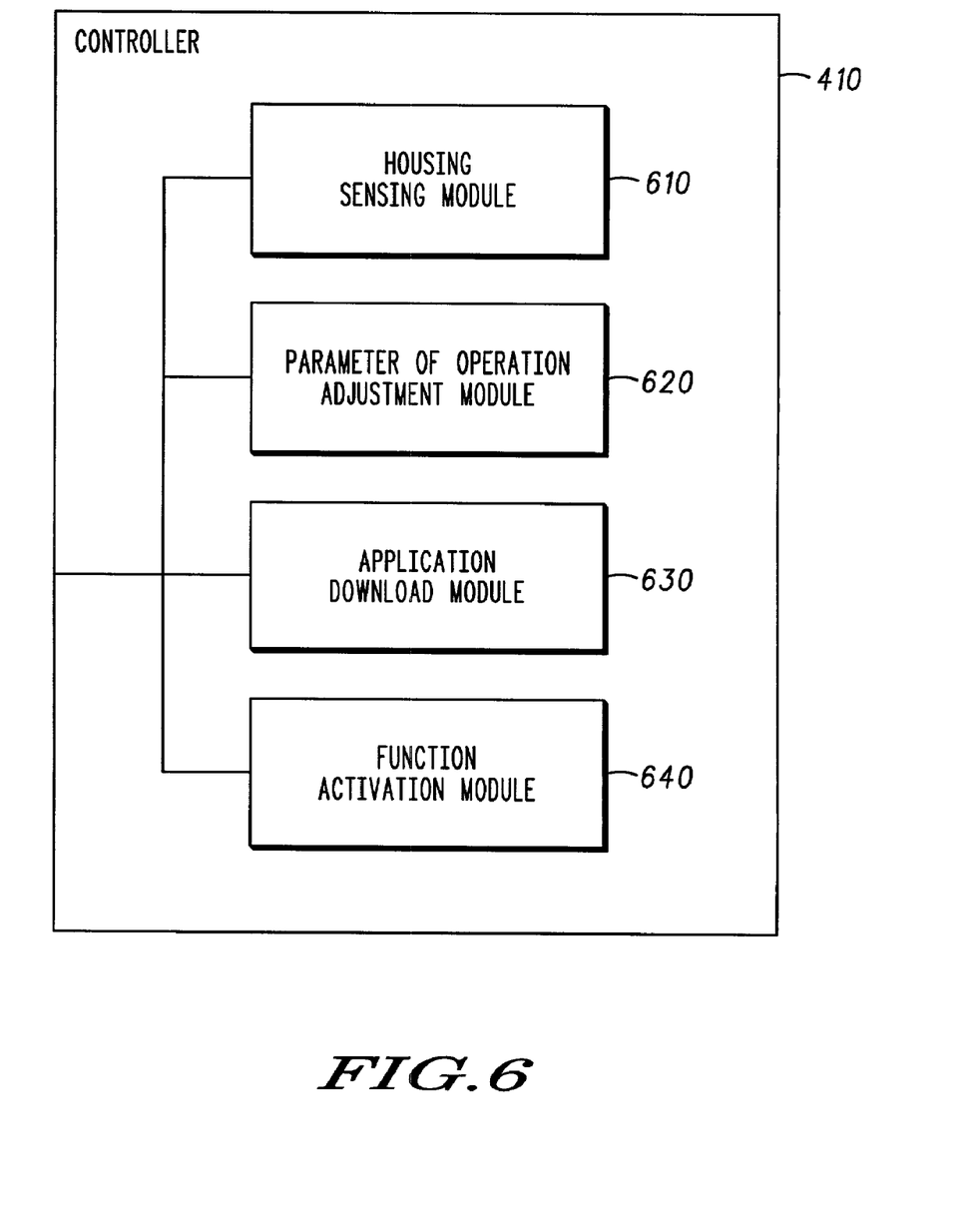
FIG. 6 is an exemplary block diagram of a controller according to one embodiment.

FIG. 6 is an exemplary block diagram of the controller 410 according to another embodiment. The controller 410 may include a housing sensing module 610, a parameter of operation adjustment module 620, an application download module 630, and a function activation module 640. In operation, the housing sensing module 610 may be configured to sense a change in a capacitive field across the capacitive array sensor 130 using a predefined conductive pattern 180 and the parameter of operation adjustment module 620 may be configured to adjust a parameter of operation of the mobile communication device in response to the sensing module sensing the change in the capacitive field using a predefined conductive pattern. The parameter of operation adjustment module 620 may further be configured to modify a capacitive sensing parameter to correlate to a function of the first replaceable housing 120. The housing sensing module 610 may be further configured to sense a replacement of a second replaceable housing with the first replaceable housing 120 by sensing a change in a capacitive field across the capacitive array sensor 130 based on the predefined conductive pattern 180. The parameter of operation adjustment module 620 may be further configured to modify a capacitive sensing parameter by remapping the capacitive array sensor 130 from a function of the second replaceable housing to a function of the first replaceable housing 130. The first replaceable housing 120 may comprise a housing including gaming controller input devices. The first replaceable housing 120 may also comprise a housing including quick dial input devices. The application download module 630 may be configured to download an application related to the first replaceable housing 120 based on the predefined conductive pattern 180. The function activation module 640 may be configured to activate a function related to the first replaceable housing 120 based on the predefined conductive pattern 180.

According to another embodiment, the housing sensing module 610 senses the replacement of a second replaceable housing with the first replaceable housing 120. For example, the housing sensing module 610 may sense a change in the capacitive field across the array sensor 130. The parameter of operation adjustment module 620 adjusts a parameter of operation of the portable device 10 based on the position of the replaceable housing 120. The parameter of operation adjustment module 620 may be configured to modify a capacitive sensing parameter to correlate to a function of the first replaceable housing 120. The parameter of operation adjustment module 620 may be further configured to modify the capacitive sensing parameter by remapping a capacitive array matrix according to a functionality of the first replaceable housing 120. The housing sensing module 610 may be configured to sense the replacement of the second replaceable housing with the first replaceable housing 120 by sensing a change in a capacitive field across the array sensor 130 based on a conductive pattern 180.

The housing sensing module 610 may be configured to sense a change in a capacitive field across the array sensor 130 using a conductive pattern 180. The parameter of operation adjustment module 620 may be coupled to the array sensor 130 and the parameter of operation adjustment module 620 may be further configured to adjust a parameter of operation of the portable device 10 in response to the housing sensing module 610 sensing the change in the capacitive field using a conductive pattern 180. The parameter of operation adjustment module 620 may be further configured to modify a capacitive sensing parameter to correlate to a function of the first replaceable housing 120. The housing sensing module 610 may be further configured to sense a replacement of a second replaceable housing with the first replaceable housing 120 by sensing a change in a capacitive field across the array sensor 130 based on the conductive pattern 180.

Figure 7:
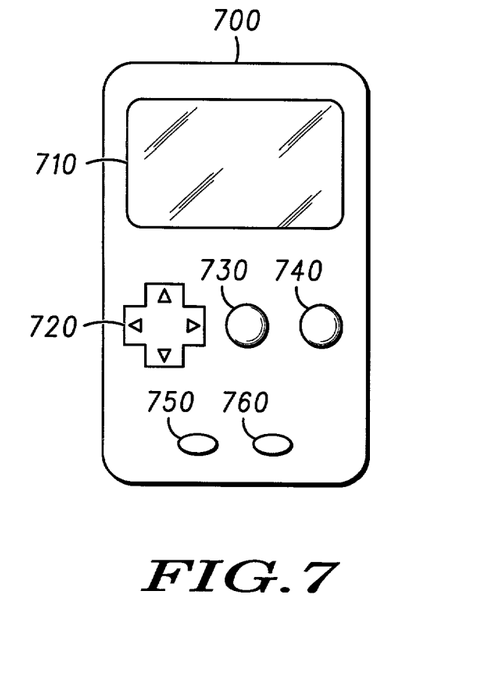
FIG. 7 is an exemplary illustration of a replaceable housing according to a one embodiment.

FIG. 7 is an exemplary illustration of a replaceable housing 700 according to a second embodiment. This embodiment illustrates the replaceable housing 700 including gaming indicators or buttons. The replaceable housing 700 can include a display opening 710, and gaming input devices such as a controller pad 720, action buttons 730 and 740, selection buttons 750 and 760, or any other button, controller, indicator, or the like useful for gaming control.

In operation, when the replaceable housing 700 is placed on a mobile device 10, the controller 410 can sense a conductive pattern 180 on the replaceable housing 700. The controller 410 can activate or download a gaming application or function for use with the replaceable housing 700. The controller 410 can then adjust a parameter of operation of the array sensor 130 to provide for the use of the gaming input devices along with the gaming function. For example, each gaming input device may include its own conductive pattern. The array sensor 130 can then sense activation of a gaming input device based on the position of the specific gaming input device conductive pattern.

Figure 8:
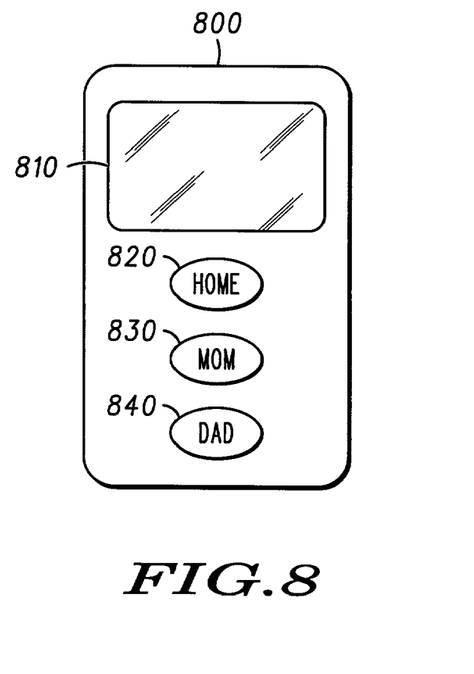
FIG. 8 is an exemplary illustration of a replaceable housing according to another embodiment.

FIG. 8 is an exemplary illustration of a replaceable housing 800 according to a third embodiment. This embodiment illustrates the replaceable housing 800 including quick dial indicators or buttons. The replaceable housing 800 can include a display opening 810, and quick dial input devices 820, 830, and 840. For example, these quick dial input devices can include buttons assigned to specific names.

In operation, when the replaceable housing 800 is placed on a mobile device 10, the controller 410 can sense a conductive pattern 180 specific to the replaceable housing 800. The controller 410 can activate or download a quick dial application or function for use with the replaceable housing 800. The controller 410 can then adjust a parameter of operation of the array sensor 130 to provide for the use of the quick dial input devices along with the quick dial function. For example, a young child can then use the mobile phone because the complexity of operation is reduced.

Figure 9:
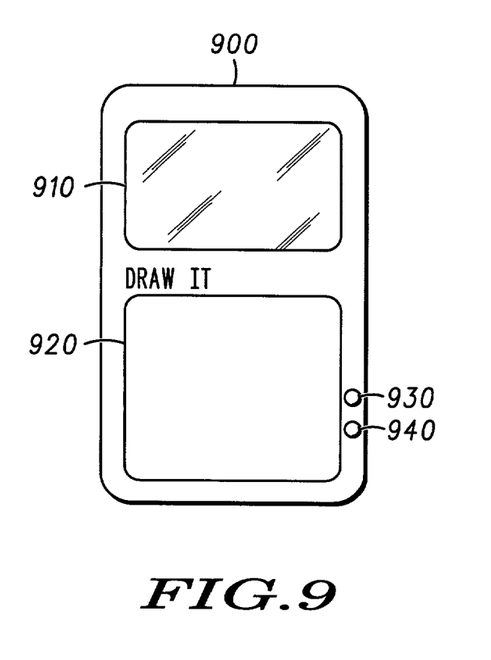
FIG. 9 is an exemplary illustration of a replaceable housing according to a third embodiment.

FIG. 9 is an exemplary illustration of a replaceable housing 900 according to a fourth embodiment. This embodiment illustrates the replaceable housing 900 including a sketching function indicator. The replaceable housing 900 can include a display opening 910, a sketchpad section 920, selection buttons 930 and 940 or any other button, controller, indicator, or the like useful for a sketchpad function.

In operation, when the replaceable housing 900 is placed on a mobile device 10, the controller 410 can sense a conductive pattern 180 specific to the replaceable housing 900. The controller 410 can activate or download a sketchpad application or function for use with the replaceable housing 900. The controller 410 can then adjust a parameter of operation of the array sensor 130 to provide for the use of the sketchpad input devices along with the sketchpad function.

Figure 10:
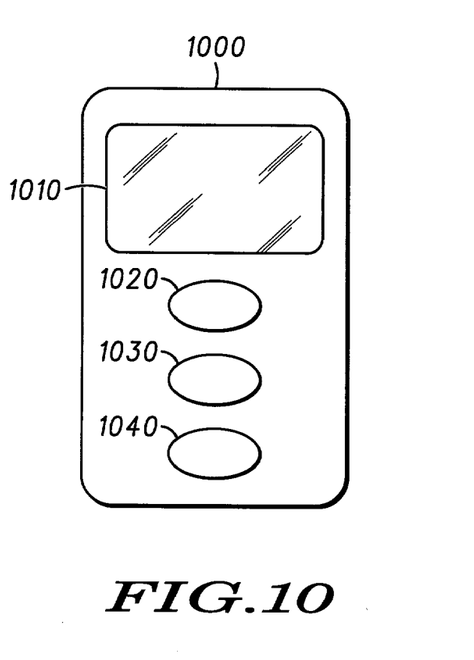
FIG. 10 is an exemplary illustration of a replaceable housing according to a fourth embodiment.

FIG. 10 is an exemplary illustration of a replaceable housing 1000 according to a fifth embodiment. This embodiment illustrates the replaceable housing 1000 including user assignable indicators or buttons. The replaceable housing 1000 can include a display opening 1010, and user assignable input devices such as buttons 1020, 1030, and 1040, or any other button, controller, indicator, or the like useful for user assignable input.

In operation, when the replaceable housing 1000 is placed on a mobile device 10, the controller 410 can sense a conductive pattern 180 on the replaceable housing 1000. The controller 410 can activate or download a user assignable application or function for use with the replaceable housing 1000. The controller 410 can then adjust a parameter of operation of the array sensor 130 to provide for the use of the user assignable input devices along with the user assignable function.

The method of this invention is preferably implemented on a programmed processor. However, the operations of the controller 410 may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the operations of the controller 410 may be used to implement the processor functions of this invention.

While this invention has been described with specific embodiments thereof, it is evident that many alternatives, modifications, and variations will be apparent to those skilled in the art. For example, various components of the embodiments may be interchanged, added, or substituted with other components of other embodiments. Accordingly, the preferred embodiments of the invention as set forth herein are intended to be illustrative, not limiting. Various changes may be made without departing from the spirit and scope of the invention.

What is claimed is:

1. A method of operation of a mobile communication device including a main housing, a first replaceable housing, and a capacitive array sensor, the method comprising:

sensing a change in a capacitive field across the capacitive array sensor based on a position of the first replaceable housing containing a predefined conductive pattern; and adjusting a parameter of operation of the mobile communication device based on the position of the first replaceable housing, wherein the adjusting step further comprises modifying a capacitive sensing parameter to correlate to a function of the first replaceable housing.

2. The method of operation of a mobile communication device according to claim 1, wherein the sensing step senses a replacement of a second replaceable housing with the first replaceable housing by sensing a change in a capacitive field across the capacitive array sensor based on the predefined conductive pattern.

3. The method of operation of a mobile communication device according to claim 2, wherein the adjusting step further comprises modifying a capacitive sensing parameter by remapping the capacitive array from a function of the second replaceable housing to a function of the first replaceable housing.

4. The method of operation of a mobile communication device according to claim 1, wherein the first replaceable housing comprises a housing including gaming controller input devices.

5. The method of operation of a mobile communication device according to claim 1, wherein the first replaceable housing comprises a housing including quick dial input devices.

6. The method of operation of a mobile communication device according to claim 1, further comprising downloading an application related to the first replaceable housing based on the predefined conductive pattern.

7. The method of operation of a mobile communication device according to claim 1, further comprising activating a function related to the first replaceable housing based on the predefined conductive pattern.

8. A method of operation of a mobile communication device including a main housing, a first replaceable housing, a second replaceable housing, and an impedance array sensor, the method comprising:

sensing a replacement of the second replaceable housing with the first replaceable housing; and adjusting a parameter of operation of the impedance array sensor based on a position of the first replaceable housing, wherein the adjusting step further comprises modifying an impedance sensing parameter to correlate to a function of the first replaceable housing.

9. The method of operation of a mobile communication device according to claim 8, wherein the adjusting step further comprises modifying the impedance sensing parameter by remapping a capacitive array matrix according to a functionality of the first replaceable housing.

10. The method of operation of a mobile communication device according to claim 8, wherein the sensing step senses the replacement of the second replaceable housing with the first replaceable housing by sensing a change in a capacitive field across the impedance array sensor based on a predefined conductive pattern.

11. A mobile communication device comprising:

a main housing;

a first replaceable housing configured to be coupled to the main housing;

a capacitive array sensor coupled to the main housing;

a sensing module coupled to the capacitive array sensor, the sensing module being configured to sense a change in a capacitive field across the capacitive array sensor, the change caused by a predefined conductive pattern; and an adjustment module coupled to the capacitive array sensor, the adjustment module being configured to adjust a parameter of operation of the mobile communication device in response to the sensing module sensing the change in the capacitive fields, wherein the adjustment module is further configured to modify a capacitive sensing parameter to correlate to a function of the first replaceable housing.

12. The mobile communication device according to claim 11, wherein the sensing module is further configured to sense a replacement of a second replaceable housing with the first replaceable housing by sensing a change in a capacitive field across the capacitive array sensor based on the predefined conductive pattern.

13. The mobile communication device according to claim 12, wherein the adjustment module is further configured to modify a capacitive sensing parameter by remapping the capacitive array sensor from a function of the second replaceable housing to a function of the first replaceable housing.

14. The mobile communication device according to claim 11, wherein the first replaceable housing comprises a housing including gaming controller input devices.

15. The mobile communication device according to claim 11, wherein the first replaceable housing comprises a housing including quick dial input devices.

16. The mobile communication device according to claim 11, further comprising a download module configured to download an application related to the first replaceable housing based on the predefined conductive pattern.

17. The mobile communication device according to claim 11, further comprising an activation module configured to activate a function related to the first replaceable housing based on the predefined conductive pattern.

18. A mobile communication device comprising:

a main housing;

a first replaceable housing configured to be coupled to the main housing;

a second replaceable housing configured to be coupled to the main housing;

a capacitive array sensor coupled to the main housing;

a sensing module configured to sense the replacement of the second replaceable housing with the first replaceable housing; and an adjustment module configured to adjust a parameter of operation of the mobile communication device based on a position of the first replaceable housing, wherein the adjustment module is further configured to modify the capacitive sensing parameter by remapping a capacitive array matrix according to a functionality of the first replaceable housing.

19. The mobile communication device according to claim 18, wherein the adjustment module is further configured to modify a capacitive sensing parameter to correlate to a function of the first replaceable housing.

20. The mobile communication device according to claim 18, wherein the sensing module is further configured to sense the replacement of the second replaceable housing with the first replaceable housing by sensing a change in a capacitive field across the capacitive array sensor based on a predefined conductive pattern.

21. A hand held portable device comprising:
   a main housing;
   a display coupled to the main housing;
   a first replaceable housing configured to be coupled to the main housing;
   a capacitive array sensor coupled to the main housing;
   a sensing module coupled to the capacitive array sensor, the sensing module being configured to sense a change in a capacitive field across the capacitive array sensor, the change caused by a predefined conductive pattern; and
   an adjustment module coupled to the capacitive array sensor, the adjustment module being configured to adjust a parameter of operation of the mobile communication device in response to the sensing module sensing the change in the capacitive field using a predefined conductive pattern,
   wherein the sensing module is further configured to sense a replacement of a second replaceable housing with the first replaceable housing by sensing a change in a capacitive field across the capacitive array sensor based on the predefined conductive pattern.

22. The hand held portable device according to claim 21, wherein the adjustment module is further configured to modify a capacitive sensing parameter to correlate to a function of the first replaceable housing.

23. The hand held portable device according to claim 21, further comprising a keypad coupled to the main housing, wherein the capacitive array sensor is located beneath the keypad.

24. The hand held portable device according to claim 21, further comprising a face cover housing coupled to the main housing, wherein the first replaceable housing is coupled to the main housing via the face cover housing.

25. The hand held portable device according to claim 21, wherein the first replaceable housing is a holster.

* * * * *